J. WIDMER.
CONVERTING RECTILINEAR INTO ROTARY MOTION.

No. 20,533. Patented June 8, 1858.

UNITED STATES PATENT OFFICE.

J. WIDMER, OF NEW HAVEN, CONNECTICUT, ASSIGNOR TO HIMSELF AND HOWARD GILBERT, OF SAME PLACE.

MODE OF APPLYING THE POWER OF THE STEAM-ENGINE.

Specification of Letters Patent No. 20,533, dated June 8, 1858.

*To all whom it may concern:*

Be it known that I, Jacob Widmer, of the city and county of New Haven, in the State of Connecticut, have invented a new and useful Improvement in the Method of Applying the Power of the Steam-Engine Without the Use of the Crank; and I do hereby declare that the following is a full, clear, and exact description of the construction, character, and operation of the same, reference being had to the accompanying drawings, which make a part of this specification, in which—

Figure 1:
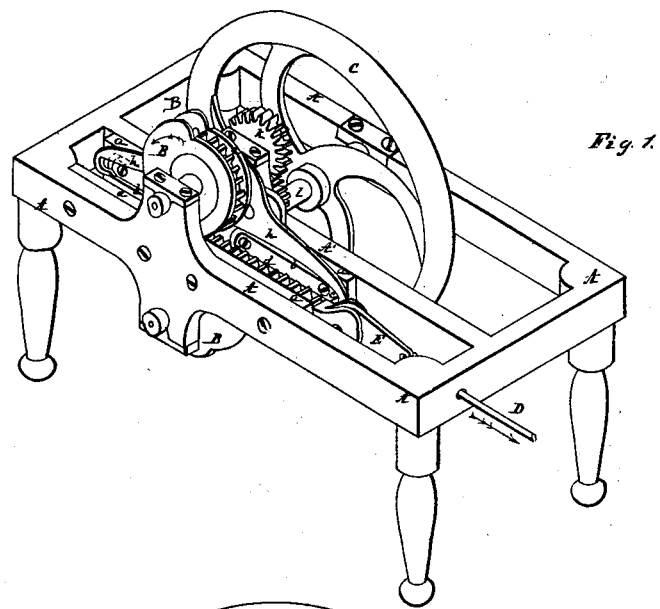
Figure 2:
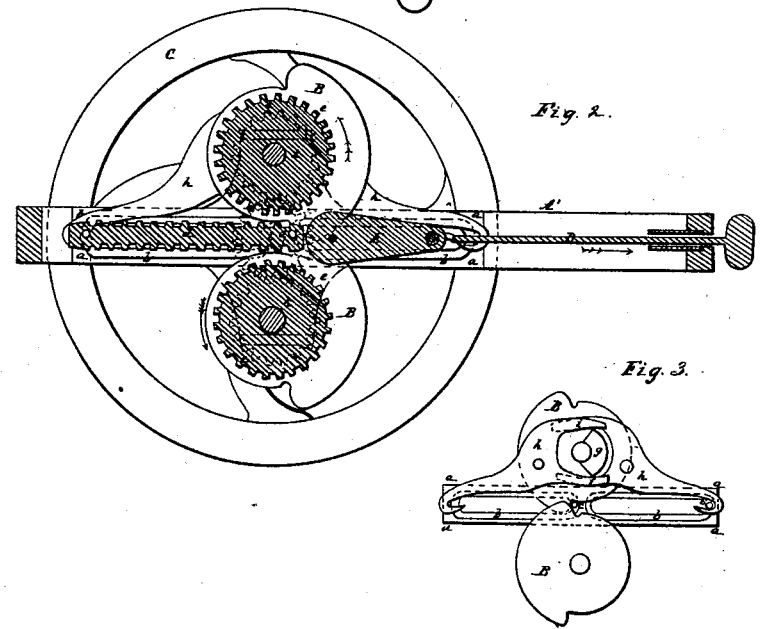
Figure 3:
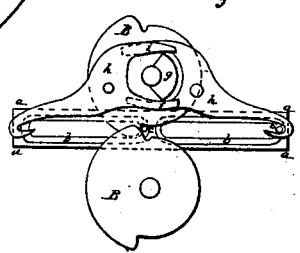

Figure 1, is a perspective view of the apparatus, showing the relative position of the rack, cams, levers, &c. Fig. 2, is a vertical plan of a section of the same. Fig. 3, is a vertical plan of a section, seen from the opposite side, showing the cams, and levers, which carry the rack past the dead centers.

My improvement consists in so arranging and connecting, a double toothed rack, cams, levers, grooves, &c., with gear wheels, that the levers, cams, and grooves, will cause the rack to act alternately upon two gear wheels, in such a manner as, essentially, to cause the full force of the steam on the piston to be given off to the machinery, &c., at all points, (except perhaps an inch at each of the two extremities or "dead centers," of the double stroke), in contradistinction to limiting it to less than one half of the evolution, as is the case when the crank is used, (that is, less than one fourth on each side between the dead centers).

I make the frame A, A, &c., of cast iron, or any other suitable material, substantially in the form shown in Fig. 1. On the inner sides of the two bars A, and A', of this frame I attach pieces, or ways, as shown at *a*, *a*, &c. Figs. 1, 2, and 3 and toward each end of each of these pieces I make an endless groove, substantially, in the form shown at *b*, Figs. 1, 2, and 3, for the noddle pins, or cross heads, to move in, as shown at *c*, Figs. 1, 2, and 3.

I make the rack, *d*, Figs. 1, and 2, of iron or any other suitable material, with teeth, or cogs, on both edges, as shown in Fig. 2, suited to work in the teeth of two gear wheels, one of which is shown at *e*, Fig. 1, and both shown at *e*, and *e*, in section, in Fig. 2, one above the other. On each face of each of these gear wheels, *e*, and *e*, I fix a thin cam, as shown at B, and B, Figs. 1, 2, and 3, substantially of the form shown in Fig. 3. The more prominent parts of these cams serve to carry the cross head of the rack past the dead center at the inner ends of the grooves, *b*, and *b*, (whichever end of the rack it may be), as indicated at *c*, Figs. 3, and 2.

I fix a cam, as shown at *g*, Fig. 3, to work the levers, *h*, and *h*, (this cam, *g*, may be placed on the shaft of the lower gear wheel, *e*, and the levers, *h*, and *h*, reversed;— or a rock shaft may be used to work the cam, as may be most convenient in any case). I make the levers, *h*, and *h*, of iron, or any other suitable material, substantially, of the shape shown in Fig. 3, (the two prongs of each lever, as *i* and *i'*, being sufficiently distant to allow the cam, *g*, to revolve), and have them work on fulcrum pins attached to any permanent support, as shown near *h*, and *h*, Fig. 3.

I have two gear wheels, as *k*, and *k*, one on the end of each of the shafts of the gear wheels, *e*, and *e*, which work into a pinion on the main shaft, *l*, Figs. 1, and 2, as shown, (dotted in red ink), in Fig. 2. These gear wheels, *k*, and *k*, by means of the pinion, communicate a rotary motion to the fly wheel, C, Figs. 1, and 2, and transfer the power of the steam engine to the machinery, &c.

Having constructed the several parts of the apparatus as before described, I attach the piston rod, as D,) to the end of the rack, *d*, by means of a short connecting bar, (as E,) as fully represented in Figs. 1, and 2, when it will be ready for use. When the rack has been moved to the position represented in Fig. 2, the cams, B, and B, Figs. 1, 2, and 3, will raise the cross head, *c*, to the upper portion of the groove, *b*, and the cam, *g*, Fig. 3, will force down the lower prongs, *i*, of the levers, *h*, and *h*, and cause the hook at the end of the lever to raise up the cross head, at the other end of the rack, into the upper portion of the groove, *b*, so that the teeth of the rack will be inserted between the teeth of the upper gear wheel, *e*, and when the piston moves in the direction indicated by the dart, the rack will revolve the upper wheel, *e*, in the direction indicated by the dart on the cam, B, and so, by means of the wheel, *k*, and pinion, give a rotary motion to the main shaft, and thereby to the machinery &c. And when the rack, *d*, is moved to the position represented in Fig. 1, the action of the cams and one of the levers will force the cross head downward into the lower portion of the groove, *b*, so that the rack will act on the lower gear wheel, *e*, and, by means of the lower wheel, *k*, and pinion, will continue the rotary motion of the main shaft, *l*, &c.—thus giving a continuous rotary motion with the full leverage.

The rotary motion of the main shaft may be reversed, as readily as in the common operation of the steam engine, by stopping the piston, and admitting the steam at the other port of the cylinder, or otherwise.

I am aware that various devices, other than the crank for converting a reciprocating rectilinear motion into a continuous rotary motion, (and the reverse) are well known;—and that racks, cams, levers, and grooves, in every variety of shapes, are common property; I, therefore, do not claim either of them, as such, as my invention:—but,—

What I claim as my invention, and desire to secure by Letters Patent, is—

The combination of the rack, (*d*,) with the cams, (B, B,) and grooves, (*b*,) when constructed, arranged, and made to produce the result, substantially, in the manner herein set forth.

2. I also claim the combination of the levers, (*h* and *h*,) with the rack, (*d*,) and cams, (*g*, and B, B,) when the whole is constructed, arranged, and made to operate, substantially, as herein described.

JACOB WIDMER.

Witnesses:
W<small>M</small>. T. G<small>ILBERT</small>,
R. F<small>ITZGERALD</small>.